United States Patent
Leonard et al.

(10) Patent No.: US 12,034,781 B2
(45) Date of Patent: Jul. 9, 2024

(54) COMPUTERIZED SYSTEM AND METHOD FOR SUPPRESSING AUDIO LEAKAGE

(71) Applicant: YAHOO AD TECH LLC, Dulles, VA (US)

(72) Inventors: Herry Leonard, Fremont, CA (US); Zhe Qian, Santa Clara, CA (US); Aditya Kathuria, Santa Clara, CA (US); Deepak Somashekhara, Fremont, CA (US)

(73) Assignee: YAHOO AD TECH LLC, New York, NY (US)

( * ) Notice: Subject to any disclaimer, the term of this patent is extended or adjusted under 35 U.S.C. 154(b) by 69 days.

(21) Appl. No.: 17/557,198

(22) Filed: Dec. 21, 2021

(65) Prior Publication Data
US 2023/0199040 A1 Jun. 22, 2023

(51) Int. Cl.
*G06F 15/16* (2006.01)
*G06F 3/16* (2006.01)
(Continued)

(52) U.S. Cl.
CPC ............ *H04L 65/403* (2013.01); *G06F 3/165* (2013.01); *H04L 67/104* (2013.01)

(58) Field of Classification Search
CPC ...... H04L 67/403; H04L 67/104; G06F 3/165
See application file for complete search history.

(56) References Cited

U.S. PATENT DOCUMENTS

| 7,020,292 B1* | 3/2006 | Heubel | H03G 3/342 |
| | | | 381/94.1 |
| 2010/0122304 A1* | 5/2010 | Scott, III | H04N 7/17318 |
| | | | 725/89 |

(Continued)

OTHER PUBLICATIONS

Chromium Bugs (A forum for the Chromium Open-Source Browser Project—Issue 687574: AEC when using Web Audio API) [online]. Feb. 1, 2017 [retrieved Dec. 15, 2021]. Retrieved from the Internet: <URL:https://bugs.chromium.org/p/chromium/issues/detail?id=687574>, comments 56, 59, 60-64, 71, and 76.

(Continued)

*Primary Examiner* — Yves Dalencourt
(74) *Attorney, Agent, or Firm* — James J. DeCarlo; Greenberg Traurig, LLP

(57) ABSTRACT

The present disclosure provides novel systems and methods of suppressing audio leakage in watch-together sessions. In an embodiment, a device is provided comprising a speaker, a microphone, a media player configured to provide a first media content audio, and a peer to peer ("P2P") communications engine including a local loopback module and a conferencing module. The local loopback module configured to receive the first media content audio, provide a second media content audio, and amplify, using the speaker, the second media content audio, and the conferencing module configured to capture, using the microphone, captured conference audio, the captured conference audio including the second media content audio, and transmit to a modified captured conference audio; wherein the P2P communications engine is configured to generate the modified captured conference audio by suppressing the second content audio from the captured conference audio.

20 Claims, 4 Drawing Sheets

(51) Int. Cl.
*H04L 65/403* (2022.01)
*H04L 67/104* (2022.01)

(56) References Cited

U.S. PATENT DOCUMENTS

| | | | | |
|---|---|---|---|---|
| 2011/0283203 | A1* | 11/2011 | Periyannan | H04N 5/265 |
| | | | | 715/753 |
| 2013/0110921 | A1* | 5/2013 | Logan | H04N 21/6405 |
| | | | | 709/204 |
| 2014/0073298 | A1* | 3/2014 | Rossmann | A63F 13/86 |
| | | | | 455/414.2 |
| 2017/0026509 | A1* | 1/2017 | Rand | H04M 1/72448 |
| 2022/0150082 | A1* | 5/2022 | Subramanian | H04L 12/1818 |

OTHER PUBLICATIONS

Github Gist (User Submission—alexciarlillo/rtcloopbackhack.js) [online]. May 2, 2020 [retrieved Dec. 15, 2021]. Retrieved from the Internet: <URL:https://gist.github.com/alexciarlillo/4b9f75516f93c10d7b39282d10cd17bc>.

* cited by examiner

COMPUTERIZED SYSTEM AND METHOD FOR SUPPRESSING AUDIO LEAKAGE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present disclosure relates generally to improving the performance and user experience of video- and audio-conferencing systems during watch-together sessions.

BACKGROUND

Currently, various technologies exist for streamlining multimedia (e.g., video and audio) content, including live multimedia content. In traditional deployments, each client device streams a multimedia video independently of other devices. Thus, even if two client devices are streaming the same live multimedia file, the timing of the streams relative to each other is of no importance since each viewer is viewing the file independently. Recently, however, various platforms have merged audio or video conferencing capabilities with multimedia streaming technologies. These platforms attempt to allow users to watch live or pre-recorded content "together" while physically being separated, otherwise known as "watch-together" sessions.

Typically, a watch-together session involves users using a web browser that provides a media player to stream the media content along with an audio/video conferencing system to allow for conferencing capabilities. The users or participants create a watch-together session and invite their friends to join the session. Part of the appeal of the watch-together paradigm is the ability of the participants to engage with each other while the media is being streamed—usually by talking to other participants while the media plays in the background.

Present systems unintentionally transmit audio from their shared media stream through the A/V conferencing system (audio playing from speakers is picked up by a microphone) to the other users. This is known as audio leakage. The other users—already listening to the streamed content locally—will hear the streamed content duplicated. In some cases, one audio stream will lag behind the other creating an echo. This occurrence results in unnecessary use of computing and networking resources in addition to a poor and counterproductive user experience.

Generally, watch-together platforms or systems utilize peer-to-peer ("P2P") communications protocols and application programing interfaces ("API"), such as the Web Real-Time Communication ("WebRTC") protocol/API, to provide a backbone for the A/V conferencing systems. Some P2P watch-together platforms include echo cancelling modules to cancel audio from the conferencing system played by the speakers and picked up by the microphones. However, the echo cancelling modules are not capable of filtering or cancelling the audio from the media player.

SUMMARY

The present disclosure provides novel systems and methods of suppressing audio leakage in watch-together sessions. In an embodiment a P2P watch-together system suppresses audio leakage from media playback by implementing an instance of a local P2P communications protocol on a P2P communications engine (i.e., a local loopback), routing the audio from a media player thereto, outputting audio from the local loopback through speakers to the user, capturing the audio and suppressing the audio from the media player before sending the captured audio to other peers or users in the watch-together session.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable.

BRIEF DESCRIPTION OF THE FIGURES

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
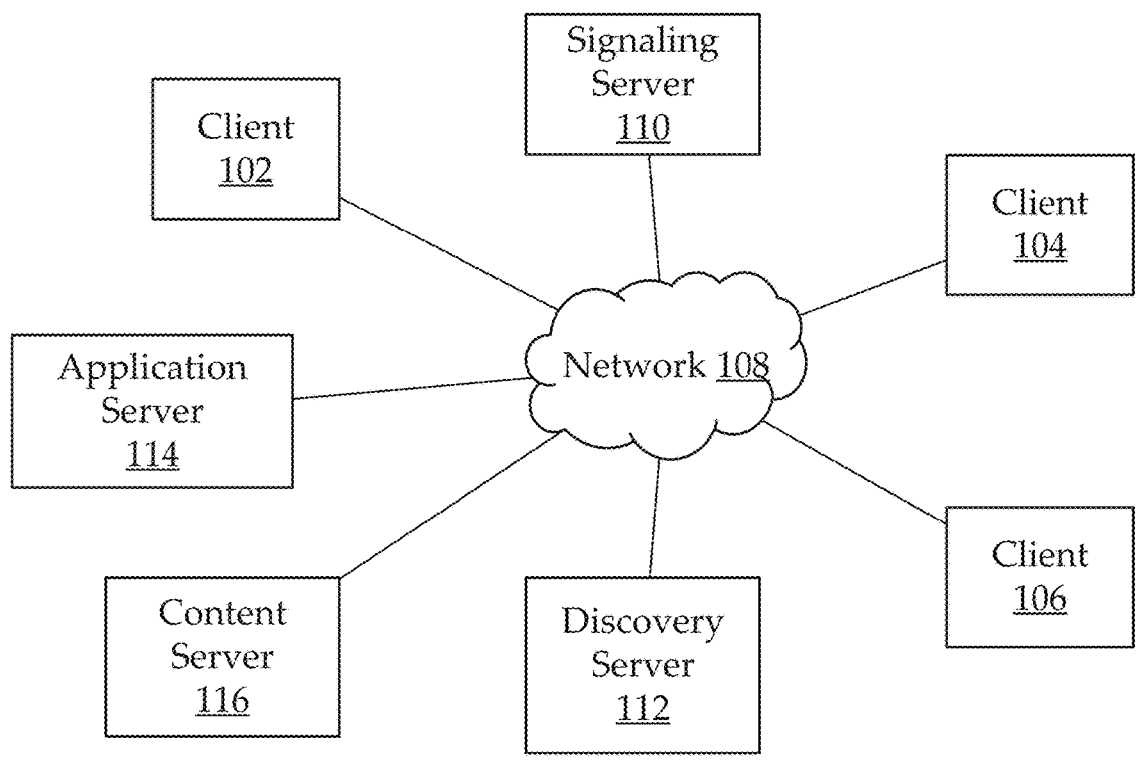
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 108 and client devices 102-106. FIG. 1 additionally includes a variety of servers, such as signaling server 110, discovery server 112, application (or "App") server 114, and content server 116.

One embodiment of client devices 102-106 may include virtually any portable computing device capable of receiving and sending a message over a network, such as network 108. Client devices 102-106 may also be described as mobile devices—i.e., configured to be portable. Thus, client devices 102-106 may include virtually any portable computing device capable of connecting to another computing device and receiving information, as discussed above.

Client devices 102-106 also may include at least one client application that is configured to receive content from another computing device (e.g., a client device or a server). In some embodiments, client devices 102-106 may also communicate with non-mobile client devices. In one embodiment, such communications may include sending and/or receiving messages, searching for, viewing and/or sharing memes, photographs, digital images, audio clips, video clips, or any of a variety of other forms of communications.

Client devices 102-106 may be capable of sending or receiving signals, such as via a wired or wireless network, or may be capable of processing or storing signals, such as in memory as physical memory states, and may, therefore, operate as a server.

In an embodiment, network 108 may be a wireless network or a combination of networks including wired and wireless networks. In an embodiment, a wireless network is configured to couple client devices 102-106 and its components with network 108. In an embodiment, a wireless network may include any of a variety of wireless sub-networks that may further overlay stand-alone ad-hoc networks, and the like, to provide an infrastructure-oriented connection for client devices 102-106.

Network 108 is configured to couple signaling server 110, discovery server 112, app server 114, and content server 116, or the like, with other computing devices, including, client devices 102-106. Network 108 is enabled to employ any form of computer readable media or network for communicating information from one electronic device to another.

The content server 116 may include a device that includes a configuration to provide any type or form of content via a network to another device. Devices that may operate as content server 116 include personal computers, desktop computers, multiprocessor systems, microprocessor-based or programmable consumer electronics, network PCs, servers, and the like. Content server 116 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like.

In some embodiments, users are able to access services provided by servers 110-116. This may include in a non-limiting example, authentication servers, search servers, email servers, social networking services servers, SMS servers, IM servers, MMS servers, exchange servers, photo-sharing services servers, signaling servers, multimedia streaming servers, gaming servers, and discovery servers, via the network 108 using their various devices 102-106.

In some embodiments, applications, such as, but not limited to, streaming applications (e.g., Hulu®, Netflix®, and the like), gaming applications (e.g., Activision®, Sony®, and the like), instant messaging applications, blog, photo or social networking applications (e.g., Facebook®, Twitter®, Instagram®, and the like), search applications (e.g., Yahoo! ® Search), and the like, can be hosted by the application server 114, or content server 116 and the like.

Thus, the application server 114, for example, can store various types of applications and application related information including application data and user profile information (e.g., identifying and behavioral information associated with a user). It should also be understood that content server 116 can also store various types of data related to the content and services provided by content server 116 in an associated content database, as discussed in more detail below.

Moreover, although FIG. 1 illustrates servers 110-116 as single computing devices, respectively, the disclosure is not so limited. For example, one or more functions of servers 110, 112, 114, and/or 116 may be distributed across one or more distinct computing devices. Moreover, in one embodiment, servers 110, 112, 114, and/or 116 may be integrated into a single computing device, without departing from the scope of the present disclosure.

In peer to peer ("P2P") communications protocols and application programing interfaces ("API"), such as WebRTC, a signaling server 110 may be used to exchange information regarding the capabilities of each client. In some embodiments, each peer or client connects to the signaling server 110 to provide information regarding the capabilities (e.g., audio/video codecs) of the application (e.g., a web browser) invoking the API and/or P2P protocol. In other embodiments, the signaling server 110 allows clients to find other clients over a network (e.g., network 108) and enables starting, stopping, and resetting a connection.

Similarly, some P2P communications protocols may use a discovery server 112 to help clients negotiate connections through network address translation ("NAT") protocols and firewalls between the clients. In some embodiments, a discovery server 112 may be a Session Traversal Utilities for NAT ("STUN") protocol server to enable a client to determine local and/or public network addresses of the client. In some embodiments, a discovery server 112 may be a Traversal Using Relays around NAT ("TURN") protocol server to relay data between the clients. In some embodiments, a TURN server may be used as a relay between clients if the clients cannot exchange data directly. In some embodiment, the discovery server 112 is part of an Interactivity Connection Establishment ("ICE") protocol that enables the peer-to-peer connection.

Figure 2:
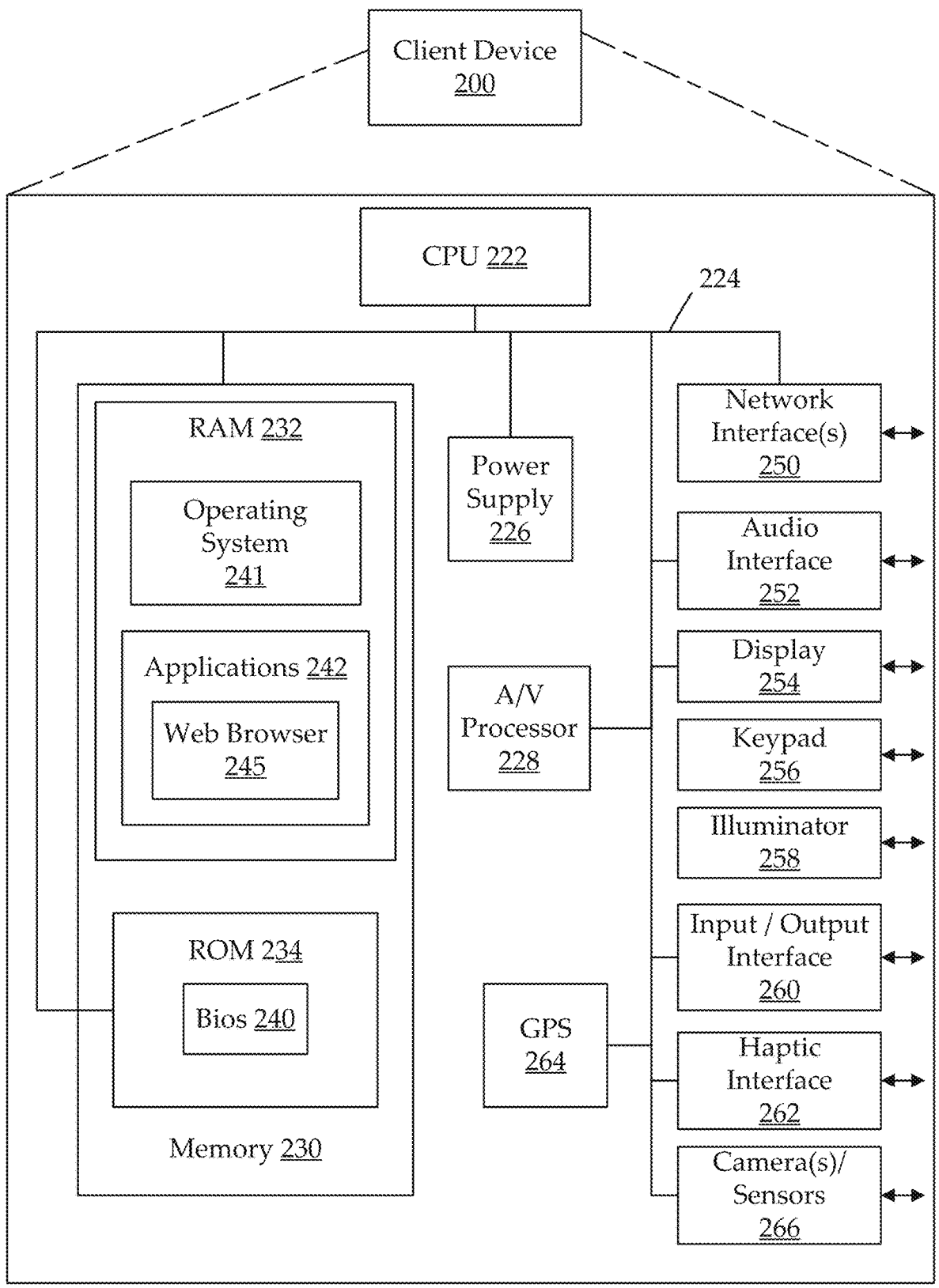
FIG. 2 is a schematic diagram illustrating an example of a client device in accordance with some embodiments of the present disclosure.

FIG. 2 is a schematic diagram illustrating a client device 200 showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. Power supply 226 provides power to client device 200. In some embodiments, client device 200 may further include an audio/video ("A/V") processor 228 to be able to manipulate and reproduce audio and video streams.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, or other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200.

Memory 230 further includes one or more data stores, which can be utilized by client device 200 to store, among other things, applications 242 and/or other information or data. For example, data stores may be employed to store information that describes various capabilities of client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within client device 200.

Applications 242 may include computer executable instructions which, when executed by client device 200, transmit, receive, and/or otherwise process audio, video, images, and enable telecommunication with a server and/or another user of another client device. Applications 242 may further include web browser 245 that is configured to send, to receive, and/or to otherwise process a web page. In some embodiments, browser 245 may implement one or more P2P APIs, media players, and/or multimedia streaming viewers of a watch-together platform.

Having described the components of the general architecture employed within the disclosed systems and methods, the components' general operation with respect to the disclosed systems and methods will now be described below.

Figure 3:
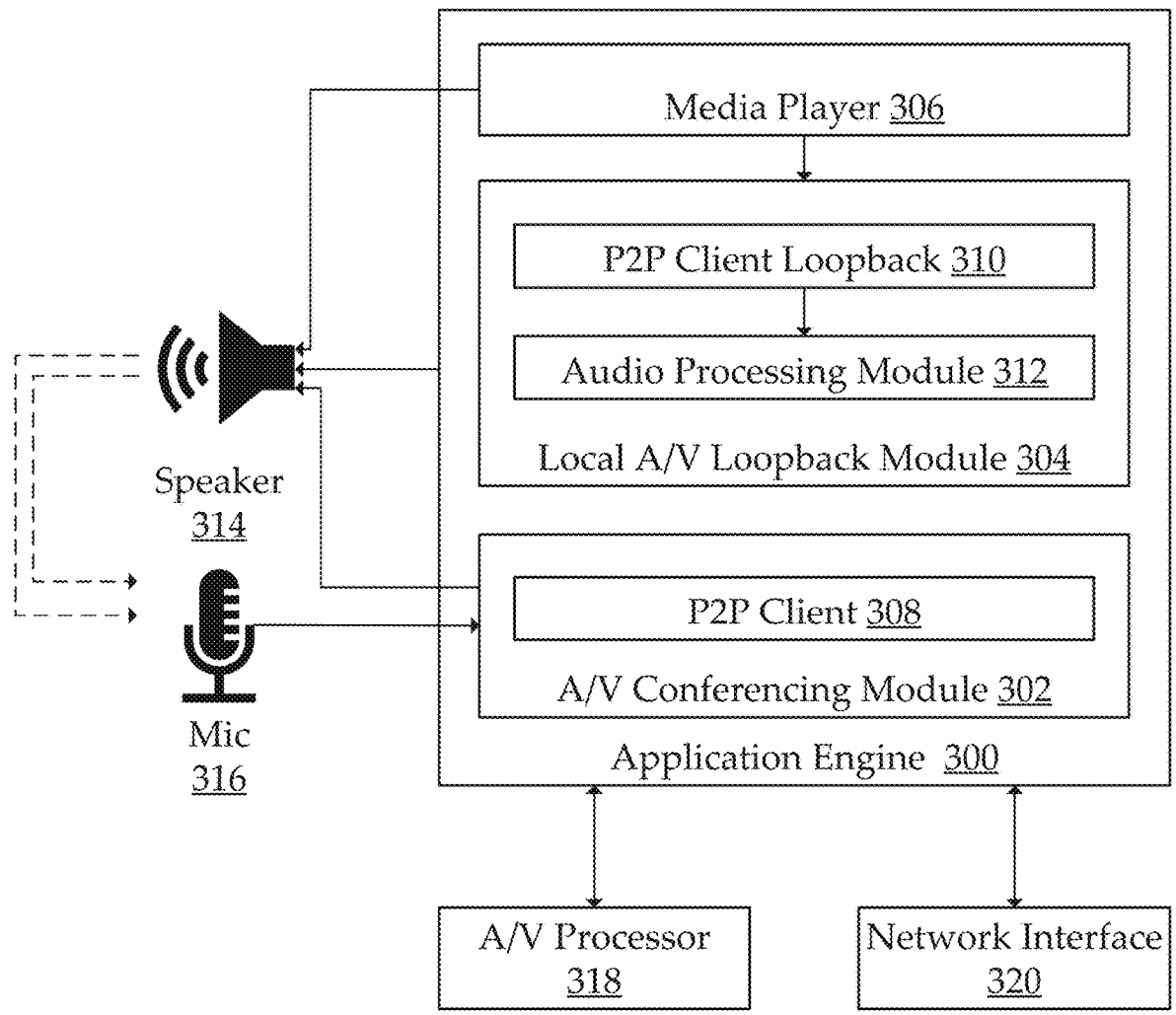
FIG. 3 is a block diagram illustrating components of an exemplary system in accordance with embodiments of the present disclosure.

FIG. 3 is a block diagram illustrating the components of a client device for performing the systems and methods discussed herein. In an embodiment, client device includes application engine 300 connected to speaker 314, microphone 316, A/V processor 318, and network interface 320. According to some embodiments, application engine 300 is at least one component of a watch-together platform to enable a watch-together session. According to some embodiments, application engine 300 can be embodied as a stand-alone application that executes on a user device (e.g., client device 200). In some embodiments, the application engine 300 can function as an application installed on the user's device, and in some embodiments, such application can be a web-based application accessed by the user device over a network. In some embodiments, where the application is a web-based application, the user accesses the application using a web browser. In some embodiments, portions of the application engine 300 function as an application installed on the user's device and some other portions can be cloud-based or web-based applications accessed by the user's device over a network, where the several portions of the application engine 300 exchange information over the network. In some embodiments, the application engine 300 can be installed as an augmenting script, program or application (e.g., a plug-in or extension) to another application or portal data structure.

According to some embodiments, the application engine 300 may leverage an A/V processor 318 to process any type of media that may be handled by the application engine 300. The A/V processor 318 can be a special purpose machine or processor and could be hosted by a cloud server (e.g., cloud web services server(s)), application server, content server, social networking server, web server, search server, content provider, gaming server, third party server, user's computing device, and the like, or any combination thereof. In an embodiment the A/V processor 318, provides hardware and software functionality to the several components of application engine 300 to manipulate, render, reproduce, and process media—including audio and video—whether accessed locally or remotely (e.g., through network 108 on servers 110-116). In an embodiment, the application engine 300 uses the A/V processor to convert a digital audio stream into analog audio waves to be played over speakers 314. In an embodiment, the application engine 300 uses the A/V processor to convert analog audio waves captured by the microphone 316 to a digital audio stream.

According to some embodiments, the application engine 300 may leverage network interface 320 to access any type of network (e.g., network 108). As discussed above, with reference to FIG. 1, the network can be any type of network such as, but not limited to, a wireless network, a local area network (LAN), wide area network (WAN), the Internet, or a combination thereof. The network interface 320 facilitates connectivity of the application engine 300 to at least one other user (e.g., in a P2P connection) or at least one server (e.g., servers 110-116). Indeed, the application engine 300 can be connected by any known or to be known method of connecting and/or enabling communication between such devices and resources.

According to an embodiment, the application engine 300 includes an A/V conferencing module 302, a local A/V loopback module 304, and a media player 306. In some embodiments, at least one of the A/V conferencing module 302 and local A/V loopback module 304 invoke an instance of a P2P client 308 providing a full duplex P2P communications protocol (e.g., WebRTC session using a WebRTC engine). According to some embodiments, the A/V conferencing module 302 provides for audio and/or video conferencing capabilities between different users and their devices. In some embodiments, the A/V conferencing module 302 is connected to speaker 314 and microphone 316 to amplify sound and capture sound, respectively. In some embodiments, the A/V conferencing module 302 allows the user to interact with other users during a watch-together session.

As noted above, an aspect of a watch-together session is the simultaneous or near-simultaneous playback or streaming of content at each user's device. According to some embodiments, application engine 300 includes a media player 306 to stream or playback the chosen media content. In some embodiments, the media content may be a movie, song, TV show, a game, and the like. In some embodiments, the media player 306 receives media content from a server (e.g., content server 116). In some embodiments, the media player 306 receives media content from a database hosted in a server (e.g., content server 116).

In some embodiments, the audio from media player 306 may be routed to the speaker 314. In some embodiments, the audio from media player 306 may be routed to the local A/V loopback module 304 and then routed to the speaker 314. In an embodiments, the audio from media player 306 may be routed directly to the speaker 314 and the local A/V loopback module 304. In an embodiment, the speaker 314 plays audio from both the media player 306, the local A/V loopback module 304, and the A/V conferencing module 302 simultaneously. In some of those embodiments, the audio stream from one source is significantly attenuated as compared to the other audio streams.

In some embodiments, speaker 314 plays the same audio stream from media player 306 and the local A/V loopback module 304 simultaneously. In some of those embodiments, the audio stream from one source may be significantly attenuated (e.g., less gain) as compared to the other audio streams. In some embodiments, the media player 306 and the local A/V loopback module 304 may have different gain adjustments. In some embodiments, a user may only adjust the gain of either the media player 306 or the local A/V loopback module 304. In some embodiments, a user may not be able to adjust the gain the media player 306 but may be able to adjust the gain of the local A/V loopback module 304. According to some embodiments, the audio processing module 312 may allow for gain (e.g., volume) adjustment of the media player 306. In some embodiments, the audio processing module 312 may allow the user to manipulate a playback or streaming characteristic of the media player 306. In some embodiments, the audio processing module 312 may allow the user to manipulate the audio stream from at least one of the media player 306 and the P2P client loopback 310.

According to some embodiments, the local A/V loopback module 304 may invoke an instance of the P2P communications protocol over a P2P Engine. In some embodiments, local A/V loopback module 304 may instance at least one P2P protocol in P2P client loopback 310 where the peers or clients are local. For example, in an embodiment where P2P communications protocol is WebRTC with an WebRTC engine, the P2P client loopback 310 may instantiate a plurality of RTCPeerConnections where the peers are local. In some embodiments, the P2P client loopback 310 may instance two RTCPeerConnections where the peers are local. In some embodiments, a first RTCPeerConnection instance may receive the audio from the media player and pass it to a second RTCPeerConnection instance. Then, the audio from the second RTCPeerConnection instance is passed directly to the speaker 314 or through the audio processing module 312. As will be noted by those skilled in the art, in some embodiments, instancing a local WebRTC loopback in conjunction with an actual WebRTC conferencing session forces the WebRTC engine to suppress the audio from the local loopback and prevents it from leaking into the conference and transmitting to the other users.

Figure 4:
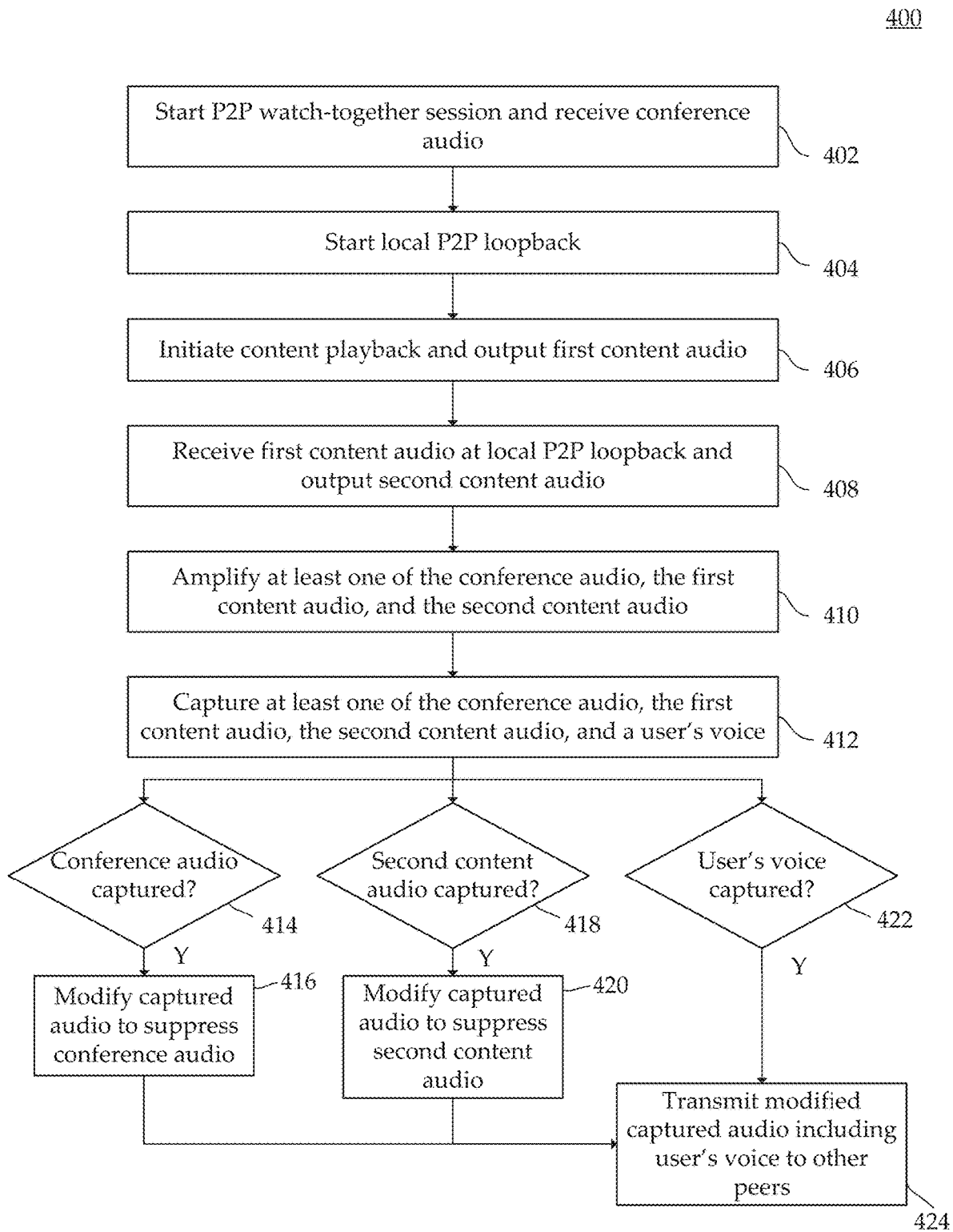
FIG. 4 illustrates a method of suppressing audio leakage in a P2P watch-together platform according to some embodiments of the present disclosure.

Turning now to FIG. 4, a method 400 of suppressing audio leakage in a P2P watch-together system including a P2P conferencing module, a local P2P loopback module, and a media player according to some embodiments of the present disclosure. In Step 402, a P2P watch-together session is started. In some embodiments, conference audio received from other peers (e.g., participants to the watch-together session) may be amplified using speakers (e.g., by speaker 314 of FIG. 3 or audio interface 252 of FIG. 2).

In Step 404, a local P2P loopback module (e.g., local A/V loopback module 304) is instantiated and started. In Step 406, media playback is started (e.g., by a media player 306) and audio from the playback (i.e., a first content audio) is outputted. As noted elsewhere herein, but specifically with respect to steps 402-406, steps may be performed simultaneously or in order without departing from the scope of the present disclosure. In Step 408, the first content audio is passed to the local P2P loopback module, in turn, the local P2P loopback module outputs a second content audio.

In Step 410, at least one of the conference audio, the first content audio, and the second content audio is amplified by the speakers. In some embodiments, at least one audio stream has a different gain from at least one other audio stream (i.e., it is perceived louder by the user). In Step 412, the amplified audio, if any, is captured by an active P2P conferencing module via a microphone (e.g., by mic 316 and A/V conferencing module 302).

In Step 414, method 400 determines whether conferencing audio is present in the captured audio, and, in Step 416, modifies the captured audio to suppresses the conferencing audio. In an embodiment, Steps 414 and 416 may be performed using an echo/noise cancelling component of the P2P watch-together platform or may be performed automatically by the P2P watch-together platform.

In Step 418, method 400 determines whether second content audio is present in the captured audio, and, in Step 420, modifies the captured audio to suppress the second content audio. In an embodiment, Steps 418 and 420 may be performed using an echo/noise cancelling component of the P2P watch-together platform or may be performed automatically by the P2P watch-together platform. In an embodiment, the P2P engine treats the second audio the same as the conferencing audio since both are coming from an instance of the P2P protocol.

In some embodiments, the captured audio may include first content audio. However, in those embodiments, the first content audio may be so attenuated (e.g., by reducing the gain) as to be imperceptible to the user and to the other users in the watch-together session. In some embodiments, the result of Steps 416 and 420 is a modified captured audio.

In some embodiments, method 400 may perform additional step 422, to determine if the captured audio or the modified captured audio includes a user's voice. In Step 424, the modified captured audio is transmitted to other users in the watch-together session.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A device comprising:
   a speaker;
   a microphone;
   a media player configured to provide a first media content audio; and
   a peer to peer ("P2P") communications engine configured to enable communications between the device and at least one other device of a watch-together system, the P2P communications engine operatively connected to the speaker and the microphone, the P2P communications engine including:
      a local loopback module configured to receive the first media content audio, provide a second media content audio corresponding to the first media content audio, and amplify, using the speaker, the second media content audio;
      a conferencing module configured to capture, using the microphone, captured conference audio, the captured conference audio including the second media content audio, and the conferencing module further configured to transmit to the at least one other device a modified captured conference audio;
      the local loopback module including P2P clients local to the device and the conferencing module, the local loopback module including P2P clients for duplex P2P communications with the at least one other device of the watch-together system; and
   the P2P communications engine configured to generate the modified captured conference audio by suppressing the second media content audio from the captured conference audio.

2. The device of claim 1, wherein the media player receives the first media content audio from a content server.

3. The device of claim 1, wherein the modified captured conference audio comprises voice audio of a user of the device.

4. The device of claim 1, wherein the P2P communications engine is a WebRTC engine.

5. The device of claim 1, wherein the media player and the P2P communications engine are part of a web browser.

6. The device of claim 1, wherein the media player and the P2P communications engine are part of a standalone application.

7. The device of claim 1, the media player further configured to amplify, using the speaker, the first media content audio at the same time the local loopback module amplifies the second media content audio, wherein the first media content audio is attenuated with respect to the second media content audio.

8. A method comprising:
  providing, by a media player of a device of a watch-together system, a first media content audio;
  receiving, by a local loopback module of a P2P communications engine of the device, the first media content audio, the P2P communications engine configured to enable communications between the device and at least one other device of the watch-together system, the P2P communications engine operatively connected to a speaker and a microphone of the device, the local loopback module including P2P clients local to the device;
  providing, by the local loopback module of the P2P communications engine, a second media content audio corresponding to the first media content audio;
  amplifying, by the local loopback module of the P2P communications engine using the speaker, the second media content audio;
  capturing, by a conference module of the P2P communications engine using the microphone, a captured conference audio including the second media content audio, the conferencing module including P2P clients for duplex P2P communications with the at least one other device of the watch-together system;
  generating, by the P2P communications engine, a modified captured conference audio by suppressing the second media content audio from the captured conference audio; and
  transmitting, by the P2P communications engine, the modified captured conference audio to the at least one other device of the watch-together system.

9. The method of claim 8, further comprising receiving, by the media player, the first media content audio from a content server.

10. The method of claim 8, wherein the modified captured conference audio comprises voice audio of a user of the device.

11. The method of claim 8, wherein the P2P communications engine is a WebRTC engine.

12. The method of claim 8, wherein the media player and the P2P communications engine are part of a web browser.

13. The method of claim 8, wherein the media player and the P2P communications engine are part of a standalone application.

14. The method of claim 8, further comprising amplifying, by the media player operatively connected to the speaker, the first media content audio at the same time the local loopback module amplifies the second media content audio, wherein the first media content audio is attenuated with respect to the second media content audio.

15. A non-transitory computer-readable storage medium for tangibly storing computer program instructions capable of being executed by a computer processor of a device of a watch-together system, the computer program instructions defining steps of:
  providing, by a media player of the device, a first media content audio;
  receiving, by a local loopback module of a P2P communications engine of the device, the first media content audio, the P2P communications engine configured to enable communications between the device and at least one other device of the watch-together system, the P2P communications engine operatively connected to a speaker and a microphone of the device, the local loopback module including P2P clients local to the device;
  providing, by the local loopback module of the P2P communications engine, a second media content audio corresponding to the first media content audio;
  amplifying, by the local loopback module of the P2P communications engine using the speaker, the second media content audio;
  capturing, by a conference module of the P2P communications engine using the microphone, a captured conference audio including the second media content audio, the conferencing module including P2P clients for duplex P2P communications with the at least one other device of the watch-together system;
  generating, by the P2P communications engine, a modified captured conference audio by suppressing the second media content audio from the captured conference audio; and
  transmitting, by the P2P communications engine, the modified captured conference audio to the at least one other device of the watch-together system.

16. The non-transitory computer-readable storage medium of claim 15, further comprising receiving, by the media player, the first media content audio from a content server.

17. The non-transitory computer-readable storage medium of claim 15, wherein the modified captured conference audio comprises voice audio of a user of the device.

18. The non-transitory computer-readable storage medium of claim 15, wherein the P2P communications engine is a WebRTC engine.

19. The non-transitory computer-readable storage medium of claim 15, wherein the media player and the P2P communications engine are part of a web browser.

20. The non-transitory computer-readable storage medium of claim 15, further comprising amplifying, by the media player operatively connected to the speaker, the first media content audio at the same time the local loopback module amplifies the second media content audio, wherein the first media content audio is attenuated with respect to the second media content audio.

* * * * *